Sept. 1, 1959 P. W. JACOBSEN 2,902,232
WEB TENSIONING CONTROL SYSTEM
Filed May 16, 1955 2 Sheets-Sheet 1
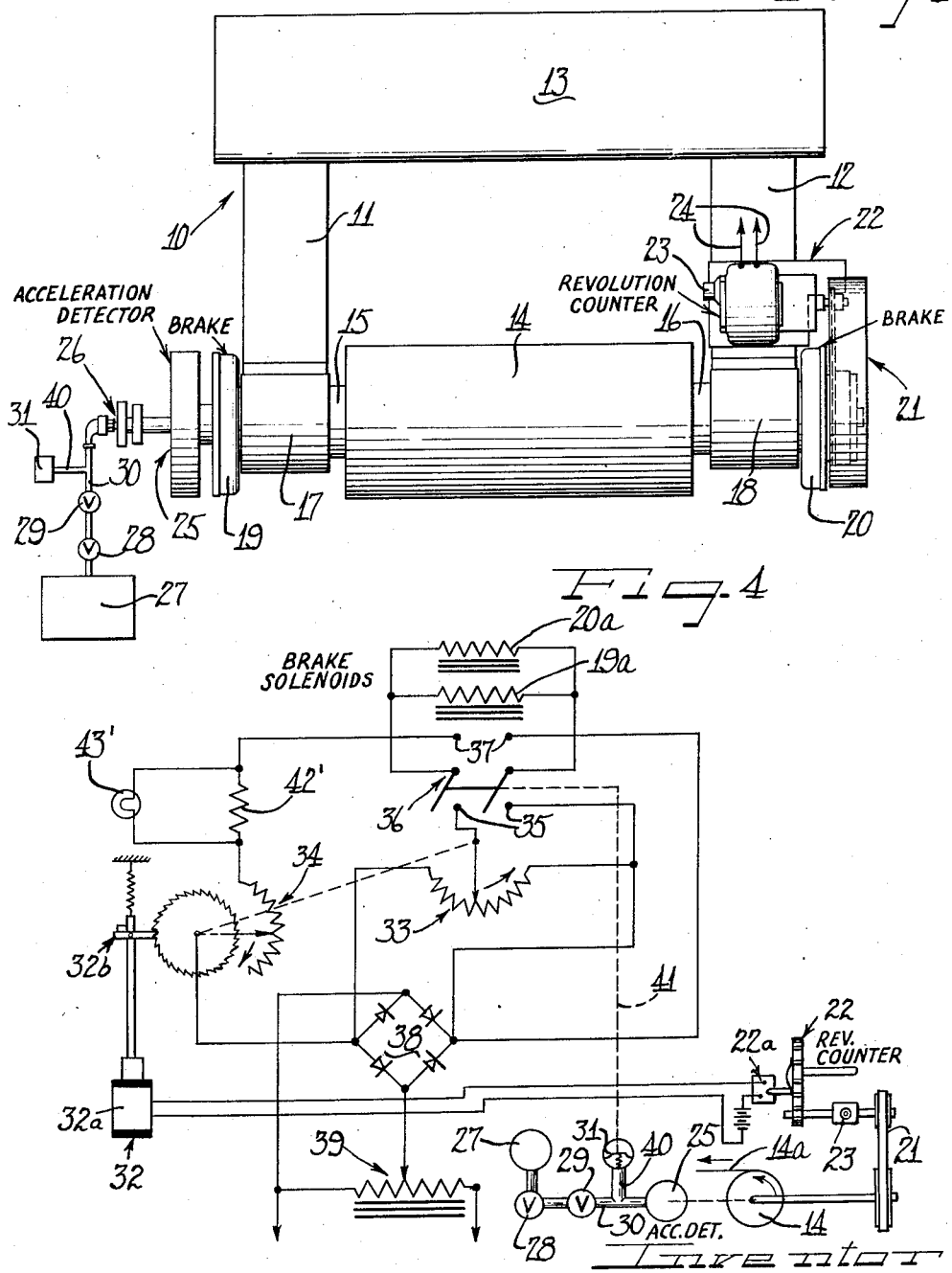
Paul W. Jacobsen

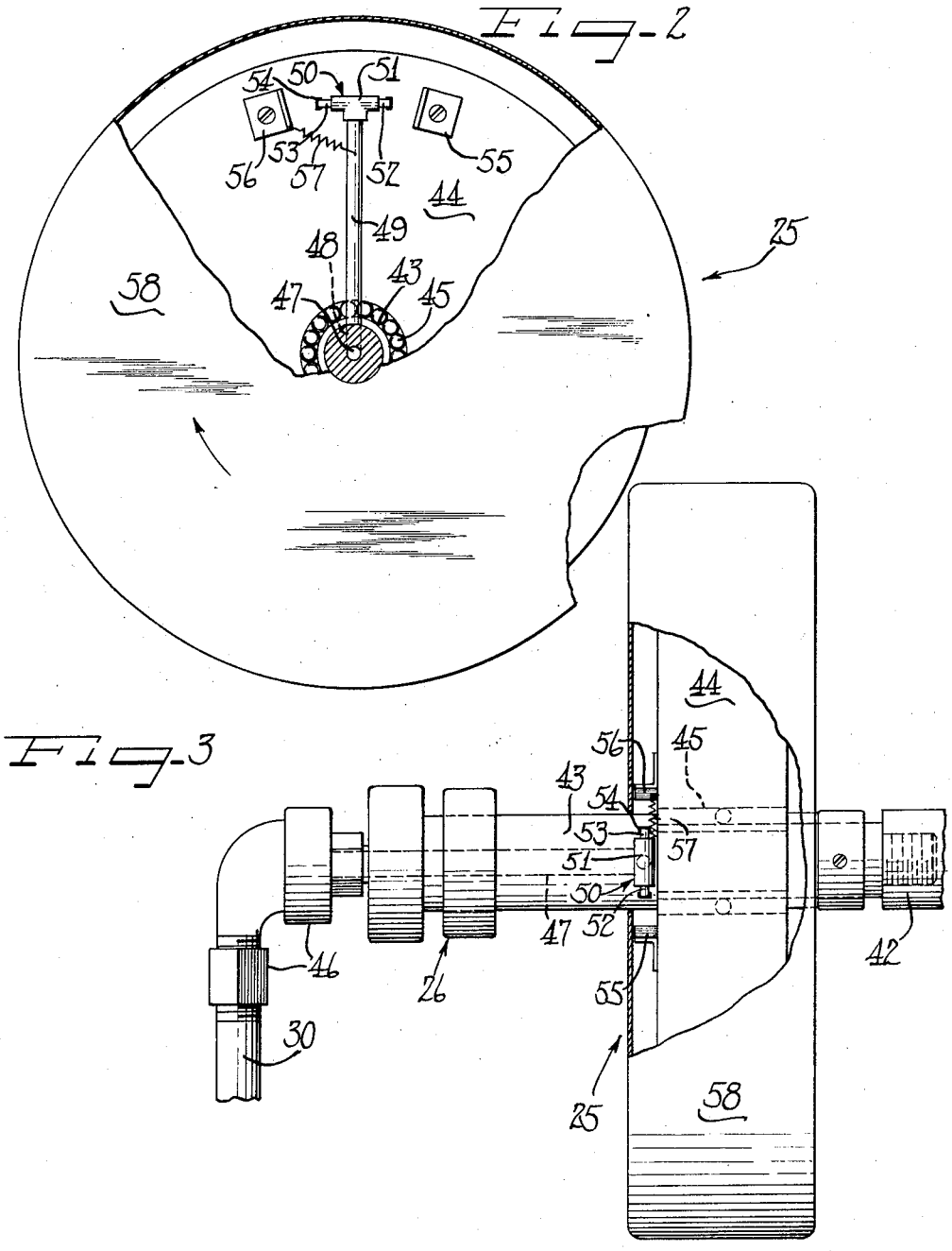

United States Patent Office 2,902,232
Patented Sept. 1, 1959

2,902,232
WEB TENSIONING CONTROL SYSTEM

Paul W. Jacobsen, Kiel, Wis., assignor to H. G. Weber & Company, Inc., Kiel, Wis., a corporation of Wisconsin Application May 16, 1955, Serial No. 508,454

2 Claims. (Cl. 242—75.47)

The present invention relates to acceleration detection and control, and more particularly to a new and improved system operable to detect angular acceleration and a control system operable in conjunction and cooperation with the acceleration detection.

As described in my copending application for patent entitled "Roll Unwinding Control System," U.S. Serial No. 507,306, filed May 10, 1955, now Patent No. 2,838,253, numerous systems have heretofore been employed for controlling the operation of a roll stand from which a roll of sheet material is unwound. The particular systems referenced to here are those systems utilized for control of the actual unwinding operation wherein the sheet material is pulled from the roll and the roll rotates either on a shaft or on means supporting the roll on the roll stand.

In my above identified copending application, I have disclosed and claimed a new and improved system for controlling the unwinding operation to readjust the brakes on the roll for the continuously diminishing torque thereon to maintain the tension on the roll substantially constant. Also discussed in my copending application, are the numerous heretofore known systems attempting to gain the end achieved by my invention but which have certain operating faults which are overcome by my invention.

The instant invention particularly relates to the starting operation of the roll to control the roll unwinding during the starting portion of the unwinding cycle and restarting portion of the unwinding cycle, which latter event occurs in the event of a shutdown or breakdown or the like. This invention constitutes an important adjunct to the invention described and claimed in my copending application and is utilizable in cooperation and conjunction therewith. It will be understood, of course, that this is an exemplary utilization of a system embodying the principles of my invention and that embodiments of my invention are of general utility where acceleration detection and control in conjunction therewith is desirable or otherwise useful.

Thus, by way of example and illustration, and without any intention to limit the scope of the present invention, an acceleration detection and control system embodying the principles of this invention is effective to utilize air pressure to actuate a pressure sensing switch in one direction while acceleration is detected and in an opposite direction when there is no acceleration whereby a starting system or an acceleration system may be switched in during acceleration and a running system may be switched in during normal running operations. This is achieved in an embodiment of the invention by utilizing a wheel which is freely rotatable and an air vent which will be open during acceleration and closed by the free wheel when the wheel attains a rotary speed equal to that of the angular velocity of the air vent. While air pressure is venting from the vent, upstream pressure will fall thus actuating the pressure sensitive switch in one direction and when the vent is closed the upstream pressure will increase to line pressure thereby actuating the switch to close into a running control system such as that described in my above identified copending application and further described in detail here.

In roll unwinding where the sheet material or web is pulled from the roll, it has been found to be highly desirable to have a reduced braking force on the roll and thereby a reduced tension on the web due to roll brake force during starting or restarting portions of the unwinding cycle of operation since there is substantial tension in the web due to the force necessary to accelerate the roll to its proper running velocity, etc. Thus it is highly desirable that the brakes be deenergized or at least partially deenergized during the starting portion of the cycle. It also has been found to be desirable to apply some limited braking force to the brakes, however, so that the roll does not overrun in angular velocity and so that the web tension may be controlled.

It is also highly desirable in roll unwinding to decrease the starting control setting for the brakes during the running operation even though the starting control is deenergized. This is desirable so that restarting operations may be affected by the simple closure of a main line switch after the fault is corrected without requiring the operator to reset the starting control for the brakes.

In view of the foregoing, it is an important object and feature of the present invention to provide a new and improved acceleration detection and control system.

Another object of the present invention is to provide a new and improved acceleration detector.

Yet another object of the present invention is to provide a new and improved starting control system for operations wherein the starting system should differ from the running system and means is provided, in accordance with this invention, to switch over from the starting system to the running system.

Still another object of the present invention is to provide a new and improved angular acceleration detector wherein a fluid vent cooperates with a freely rotatable vent closure to vent fluid pressure during acceleration and to close the fluid vent during continuous operation whereby an upstream pressure sensitive switch actuator will actuate a switch between starting system controls and running system controls.

Another object of the present invention is to provide a new and improved control system for a roll unwinding stand, in which system there is provided roll acceleration detection means cooperating with means to switch from a starting control system to a running control system when the roll angular velocity for proper running conditions has been attained by pulling the web from the roll or otherwise driving the roll.

Still other objects, features and advantages of the present invention will become readily apparent from the following detailed description of the present invention and an embodiment thereof, from the claims, and from the accompanying drawings in which each and every detail shown and illustrated is fully and completely disclosed as a part of this specification, in which like reference numerals refer to like parts, and in which:

Figure 1 is a more or less schematic and diagrammatic illustration of a roll stand with control mechanism cooperatively associated therewith in accordance with the principles of the present invention;

Figure 2 is a broken fragmental illustration of an acceleration detection device embodying the principles of the present invention;

Figure 3 is an enlarged plan view of the acceleration detection portion of the device of Figure 1; and, Figure 4 is a schematic and diagrammatic illustration of the electrical, mechanical and pneumatic elements of the control system of this invention.

As shown on the drawings:

As stated hereinbefore, it will be appreciated that embodiments of the present invention are of general utility and that the embodiment of the invention illustrated here has been illustrated and described in conjunction with a roll unwinding control system and mechanism by way of example only and not by way of any limitation. This example has been shown and described herein in view of the example being one wherein the principles of the present invention may be applied with great utility.

Thus, there is illustrated in Figure 1 a roll stand 10 wherein a pair of extending arms 11 and 12 are supported and moved by a support and arm driving structure 13 to drive the arms to rotatably support and carry a roll 14 of sheet material. Under normal operating conditions the web or sheet material is pulled from the roll 14 and the roll rotates on a shaft or other supporting means 15 and 16 journalled in bearings 17 and 18 on the outer extended ends of the arms 11 and 12 of the roll stand 10. Laterally outwardly from the bearings 17 and 18 the roll supporting elements or shafts 15 and 16 rotatably engage brakes 19 and 20 which, in this embodiment of the invention, are preferably electrically operated brakes such as the magnetic brakes available from the Warner Electric Brake & Clutch Co. of Beloit, Wisconsin. With brakes of this type, the braking force may be controlled by controlling the electrical energy supplied to the brakes and thus the tension on the web being pulled from the roll 14 may be controlled.

Since it is important that the brakes 19 and 20 be reset, as described in my above identified copending application for patent, on the lateral outer side of the brake 20 the brake carries a mechanical coupling 21 which drivingly interconnects the brake 20 and a revolution counting generator switch mechanism 22 such as a Cyclo-Monitor, available from the Counter and Control Corporation, of Milwaukee, Wisconsin. This device is operative to generate an electrical pulse of energy or to close a circuit to a source of electrical energy after each group of a selected number of revolutions. The selected number of revolutions between pulses switch closing of the revolution counter may be set by manually setting a control dial such as the dial 23 on the revolution counter mechanism 22. Upon each pulse generation or switch closing an electrical pulse will be transmitted over electrical leads 24 connected to a drive mechanism for controlled movement and resetting of rheostats controlling the electrical supply to the brakes 19 and 20.

On the other side of the machine 10, an acceleration detector 25 is drivingly connected to the brake 19 or the shaft or roll support member 15 for detecting starting operations or starting portions of the unwinding operation. The acceleration detector 25 is supplied with pressurized fluid such as, for example, air through a rotary coupling 26 leading from an air pressure source 27 and between which elements there are provided a pair of valves 28 and 29 which are respectively a pressure reducing valve immediately downstream from the air supply source, and a needle valve immediately downstream from the pressure reducing valve. Further, between the needle valve and the rotary coupling the air line 30 is tapped for connection with a pressure sensitive switch actuator 31.

Referring to Figure 4 the inter-connection, cooperation and interrelation of the above described mechanism and elements of the system will be readily observed. In Figure 4 it is seen that the web 14a being pulled from the roll 14 drives the revolution counter generator switch mechanism 22 through the mechanical coupling 21 and that the output from the revolution counter 22 is fed over the leads 24 to a drive 32 which is operative upon each pulse from the revolution counter 22 to step by step drive a running control rheostat 33 and a starting control rheostat 34. The running control rheostat 33 is connected to a pair of end terminals 35 of a double-pole double-throw switch 36, the arms of which are connected to the solenoids 19a and 20a of the brakes 19 and 20. The remaining pair of end terminals 37 of the double-pole double-throw switch 36 are connected through the starting control rheostat 34 to a full wave rectifier 38 which is effective for full wave rectifying electrical energy supplied thereto from a source (not shown) connected thereto through a variable transformer 39.

The roll 14, when driven by having the web 14a pulled therefrom as indicated by the directionalized arrows, also drives the acceleration detector 25 which is supplied with pressurized fluid from the source 27 successively through the pressure reducing valve 28 and the needle valve 29 which needle valve is connected to the acceleration detector 25 through a feed pipe 30 having a tap 40 therein leading to a pressure sensitive switch actuator 31 which is coupled as indicated by the mechanical coupling line 41, to the throw arms of the switch 36.

The system is so coordinated, as described in my above identified copending application for patent, that after each selected number of revolutions of the roll 14, during running operations, the revolution counter 22 will supply an electrical pulse to the rheostat drive mechanism 32, which includes a solenoid 32a and ratchet mechanism 32b as shown in detail in said application for patent and schematically in Figure 4, to step-by-step drive the rheostats 33 and 34 to reduce the settings thereof and thereby reduce the energization of the solenoids 19a and 20a in the brakes 19 and 20. It is an important feature of this invention that the rheostat drive mechanism 32 drives the starting rheostat 34 in addition to the running rheostat 33 so that after initial starting during which the switch arms are closed to the terminals 37 (it being noted that during running operations the switch arms are closed to the terminals 35) the starting control rheostat 34 will be step-by-step reset to a lesser position so that restarting after a break-down may be effected by simply closing a main line switch (not shown) without any necessity of recalculating a new starting position for the starting control rheostat 34. Also in accordance with this invention the starting control circuit including the rheostat 34 is provided with a series impedance, such as a resistance 42', across which there is connected a starting indicator light 43' which will be energized whenever the starting control circuit is energized.

In accordance with the principles of this invention the acceleration detector 25 is effective to bleed down air pressure in the lines 30 and 40 during starting conditions in which the roll 14 is angularly accelerating so that the pressure sensitive switch actuator 31 will be effective to close the arms of the switch 36 onto the terminals 37 during starting conditions and during which the roll 14 is accelerating. To this end, the pressure reducing valve 28 is effective to reduce pressure from the fluid supply source 27 into the needle valve 29 to a pressure of, for example, eight pounds per square inch. The needle valve 29 through which the air passes into the line 30 is effective to limit the air flow rate through the needle valve to a rate below which the air can escape from the vent (hereinafter described) in the acceleration detector 25. These valves being set as described, during acceleration conditions, the air in the lines 30 and 40 will be vented through the acceleration detector 25 at a greater rate than air is supplied into the lines from the needle valve 29 whereby the pressure in the lines 30 and 40 will fall below a value of, for example, two pounds per square inch whereby the switch actuator 31 will close the switch arms of the switch 36 onto the terminals 37. When the roll 14 ceases to accelerate, the acceleration detector vent will be closed whereby pressure in the lines 30 and 40 will increase to eight pounds per square inch or above a value of, for example, six pounds per square inch which will actuate the switch actuator 31 to move the switch arms of the switch 36 from the terminals 37 and close the arms onto the terminals 35 thereby opening the starting control circuit and closing the running control circuit including the running control rheostat 33.

The details of an embodiment of an acceleration detector in accordance with this invention are illustrated in Figures 2 and 3. The acceleration detector illustrated in Figures 2 and 3 includes a driving connection 42 to the brake 19 of Figure 1 whereby a center shaft 43 extending through a freely rotatable wheel 44 is driven by a rotational movement of the roll 14. The rotatable wheel 44 is mounted on a bearing 45 which journals the wheel 44 so that the wheel is freely rotatable with respect to the shaft. At the outer end of the shaft 43 it is provided with a rotatable air coupling 26 whereby it is connected to the air line 30 and appropriate fittings 46 and may be supplied with air from the air line 30 leading to a bore 47 in the shaft 43 and extending there into from the connection 26 to a position immediately adjacent to or under the bearing 45. A radial bore 48 in communication with the axial bore 47 is provided in the shaft 43 immediately adjacent to the wheel 44 and a relatively rigid length of pipe or tubing 49 is secured in the bore 48 to have air or other fluid communication with the passages 47 and 48 and hence with the air feed tube 30. At the radial outer end of the pipe 49 fluid vent means 50 is secured thereto and, in the embodiment of the invention illustrated here, comprises a T 51 with a pair of extensions 52 and 53 leading therefrom substantially parallel to a tangent to the shaft 43 or wheel 44. If the shaft 43 should be rotating in a clockwise direction as illustrated in Figure 2, or in a direction of the arrow on the wheel 44 in Figure 2, the tube extension 52 is capped while the tube extension 53 is provided with an apertured cap 54. A pair of vent stops 55 and 56 are secured to the wheel 44 substantially adjacent to but slightly spaced from the ends of the tube extensions 52 and 53. Also, a biasing tension spring 57 is secured between the stop 56 and the tube 49.

When the roll 14 is rotated by pulling forces applied on the web 14a, the shaft 43 will be driven through the driving connection 42 so that the radial extension air tube or pipe 49 will rotate therewith and move away from the stop 56 under starting or acceleration conditions. When the shaft 43 is accelerating, the wheel 44 will rotate at a lesser speed or at the same speed with a drag whereby the aperture vent in the cap 54 will be spaced from the vent closure stop 56 and air pressure in the line 30 will be vented through the bore 47 and 48 in the shaft 43. When the roll 14 ceases to accelerate, the wheel 44 will be rotating at substantially the same speed as the shaft 43, the tube extension 52 having driven the wheel by means of the drive connection from shaft 43 through pipe 49, extension 52 and the stop 55. The spring 57 will now pull wheel 44 clockwise as seen in Figure 4 to engage stop 56 with the aperture in the cap 54 whereby air pressure will cease to be vented from the tube 30. Figures 2 and 3 may be thought of as illustrating the fluid vent means 50 being moved from a position against the stop 55 to a position against the stop 56 at the point of time when the wheel 44 just reaches shaft speed. In other words, Figures 2 and 3 illustrate the fluid vent means 50 in the process of being moved in the counterclockwise direction by the spring 57 and actually show the fluid vent means in an intermediate position between the stops 55 and 56. When the apertured cap 54 is actually held against the stop 56 by spring 57, a high pressure condition exists in the fluid system as illustrated in Figure 4 and switch 36 assumes its lower position as seen in Figure 4 engaging terminals 35 to energize the running control rheostat 33. To avoid air friction and skin effects on the wheel 44, the wheel and tube extensions and stops are all enclosed within an annular housing 58 secured to the shaft 43 and rotatable therewith.

From the foregoing, it will be readily seen that while the shaft 43 is accelerating, pressure will be reduced in the tube 30 whereby the starting control will be switched in to control the brakes for the roll 14 while upon succession of acceleration, the vent will close and pressure will rise in the tube 30 whereby the actuator 31 will cause the starting control to be opened and the running control circuit to be closed. It will also be observed that numerous variations and modifications may be effected without departing from the true spirit and scope of the novel concepts and principles of this invention. I, therefore, intend to cover all such modifications and variations which fall within the true spirit and scope of the novel concepts and principles of this invention.

I claim as my invention:

1. In a control system to control brakes on a roll stand for tensioning the web of a roll as the roll is unwound by pulling the web therefrom, a running control system, a starting control system, and means to switch the brakes from the starting control system to the running control system, the improvement characterized by an acceleration detection mechanism for controlling said switch means and comprising a rotatable shaft coupled to the roll stand for co-rotation therewith, a fluid vent assembly secured to said shaft and having a vent for discharging fluid pressure from said assembly, fluid passage means connected with said fluid vent assembly for supplying fluid under pressure to said vent assembly for discharge through said vent, a wheel journalled on said shaft and substantially freely rotatable with respect to said shaft, stop members secured to said wheel and disposed in advance and in trailing relation to said fluid vent assembly respectively for engagement therewith, a spring connected between said fluid vent assembly and said wheel and operative in the absence of acceleration of said shaft to hold said vent assembly against the stop member in trailing relation to the vent assembly, said vent being substantially closed when said vent assembly is against said stop member in trailing relation to the vent assembly but otherwise being substantially unobstructed whereby in the absence of acceleration of said shaft there is a relatively high pressure in said fluid passage means and whereby during acceleration the vent is substantially unobstructed and a relatively low pressure exists in said fluid passage means downstream of said vent, means responsive to said relatively high pressure in said fluid pressure means and coupled to said switch means to actuate said switch means to switch the brakes from the starting control system to the running control system when said shaft ceases to accelerate, and said acceleration detection mechanism being operative to maintain said relatively high pressure in said fluid passage means during deceleration of said shaft, said acceleration detection mechanism being characterized by a rotating casing substantially enclosing said wheel and secured to said shaft for rotating conjointly therewith to provide an air gap about said wheel travelling at substantially the speed of said wheel.

2. An acceleration detection mechanism comprising a rotatably driveable shaft, a fluid vent assembly secured to said shaft and having a vent for discharging fluid pressure therefrom, fluid passage means for supplying fluid pressure to said fluid vent assembly for discharge through said vent, a wheel journalled on said shaft and substantially freely rotatable with respect thereto, stop members secured to said wheel and cooperatively arranged in advance and in trailing relation to said fluid vent assembly respectively for engagement therewith, a spring connected between said fluid vent assembly and said wheel and operative in the absence of acceleration of said shaft to hold said vent assembly against the stop member in the trailing relation to the vent assembly, said vent being substantially closed when said vent assembly is against said stop member in trailing relation to the vent assembly but otherwise being substantially unobstructed whereby in the absence of acceleration of said shaft there is a relatively high pressure in said fluid passage means downstream of said vent and whereby during acceleration of said shaft there is a relatively low pressure in said fluid passage means downstream of said vent, and said mechanism being particularly characterized by a rotating casing substantially enclosing said wheel and secured to the shaft for rotation conjointly therewith to provide an air gap about said wheel travelling at substantially the speed of said wheel.

References Cited in the file of this patent

UNITED STATES PATENTS

| | | |
|---|---|---|
| 667,474 | Wilson | Feb. 5, 1901 |
| 2,630,815 | Worthing | Mar. 10, 1953 |
| 2,723,806 | Carter | Nov. 15, 1955 |
| 2,838,253 | Jacobsen | June 10, 1958 |

FOREIGN PATENTS

| | | |
|---|---|---|
| 848,443 | France | July 24, 1939 |